United States Patent [19]

Zook et al.

[11] Patent Number: 4,850,009

[45] Date of Patent: Jul. 18, 1989

[54] PORTABLE HANDHELD TERMINAL INCLUDING OPTICAL BAR CODE READER AND ELECTROMAGNETIC TRANSCEIVER MEANS FOR INTERACTIVE WIRELESS COMMUNICATION WITH A BASE COMMUNICATIONS STATION

[75] Inventors: Ronald E. Zook; Peter P. Gombrich, both of Boulder, Colo.

[73] Assignee: CliniCom Incorporated, Boulder, Colo.

[21] Appl. No.: 203,549

[22] Filed: May 31, 1988

Related U.S. Application Data

[63] Continuation of Ser. No. 862,149, May 12, 1986, abandoned.

[51] Int. Cl.⁴ .............................. H04M 11/00
[52] U.S. Cl. ............................ 379/96; 379/110; 379/61; 379/56; 235/375
[58] Field of Search ............ 379/91, 96, 56, 58, 379/59, 63, 61, 110; 340/825.44, 825.45, 825.46, 825.35, 825.36; 235/375-385

[56] References Cited

U.S. PATENT DOCUMENTS

| | | |
|---|---|---|
| 3,439,320 | 4/1969 | Ward . |
| 3,715,570 | 11/1974 | Weichselbaum et al. . |
| 3,803,571 | 4/1974 | Luz . |
| 3,848,112 | 11/1974 | Weichselbaum et al. . |
| 3,891,980 | 6/1975 | Lewis et al. . |
| 3,898,619 | 8/1975 | Carsten et al. . |
| 4,121,574 | 10/1978 | Lester . |
| 4,209,787 | 6/1980 | Freeny, Jr. . |
| 4,227,258 | 10/1980 | Root et al. . |
| 4,274,083 | 6/1981 | Tomoeda . |
| 4,303,910 | 12/1981 | McCann . |
| 4,337,462 | 6/1982 | Lemelson . |
| 4,359,631 | 11/1982 | Lockwood et al. . |
| 4,411,016 | 10/1983 | Wakeland ............... 382/62 |
| 4,445,028 | 4/1984 | Huber ................... 235/472 |
| 4,456,793 | 6/1984 | Baker et al. ............ 379/56 |
| 4,471,165 | 9/1984 | De Fino et al. ........ 179/2 A |
| 4,471,345 | 9/1984 | Barrett, Jr. . |
| 4,473,884 | 9/1984 | Behl . |
| 4,476,381 | 10/1984 | Rubin . |
| 4,481,382 | 11/1988 | Villa-Real ............. 179/2 EA |
| 4,483,683 | 11/1984 | Alley, Sr. .............. 441/69 |
| 4,486,624 | 12/1984 | Puhl et al. . |
| 4,486,624 | 12/1984 | Puhl et al. ............. 179/2 EB |
| 4,488,035 | 12/1984 | Withnall et al. . |
| 4,489,313 | 12/1984 | Pfister . |
| 4,491,725 | 1/1985 | Pritchard . |
| 4,503,288 | 3/1985 | Kessler .................. 379/96 |
| 4,508,935 | 4/1985 | Mastromoro .......... 179/2 EA |
| 4,519,066 | 5/1985 | Barrett, Jr. et al. . |
| 4,523,087 | 6/1985 | Benton .................. 235/379 |
| 4,528,444 | 7/1985 | Hara et al. . |
| 4,569,421 | 2/1986 | Sanosteat .............. 186/39 |
| 4,588,881 | 5/1986 | Pejas et al. ........... 235/385 |
| 4,593,155 | 6/1986 | Hawkins ............... 179/2 EA |
| 4,598,275 | 7/1986 | Ross et al. . |
| 4,625,276 | 11/1986 | Benton et al. ........ 364/408 |
| 4,628,193 | 12/1986 | Bum ...................... 235/375 |
| 4,634,810 | 1/1987 | Grassi et al. ........... 379/61 |

OTHER PUBLICATIONS

Potential Use of Bar Codes To Implement Automated Dispensing Quality Assurance Programs, *Hospital Pharmacy*, vol. 20, May 1985, Hokanson et al.

Bar Coding For Medical Device Labeling, *MD+DI*, Aug. 1983, Richard Farb.

Uniform Labeling System for Blood Services by Hubbell et al., *Medical Instrumentation*, vol. 15, No. 1, Jan.-Feb. 1981.

Bar Code Finds Identity as User-Input Alternative, *Systems and Software*, Apr. 1985, Ron Scheiderman.

Integrated Hospital Computer System, *Systems Technology*, Dec. 1978, No. 30, Stobart et al.

*Primary Examiner*—Robert Lev
*Attorney, Agent, or Firm*—Merchant, Gould, Smith, Edell, Welter & Schmidt

[57] ABSTRACT

A portable handheld terminal (20) including optical bar code reader apparatus. A housing (22) having first and second spaced apart, opposing major surfaces (24,26) extending longitudinally between first and second end portions (28,30). A handle portion (40) being interconnected to the housing (22) and extending longitudinally along the second surface (26) so as to provide a handle for holding the bar code reader apparatus. Additionally, the portable handheld terminal (20) includes an optical bar code reader apparatus utilizing a binary imaging sensor (52) and an RF transceiver (79).

18 Claims, 5 Drawing Sheets

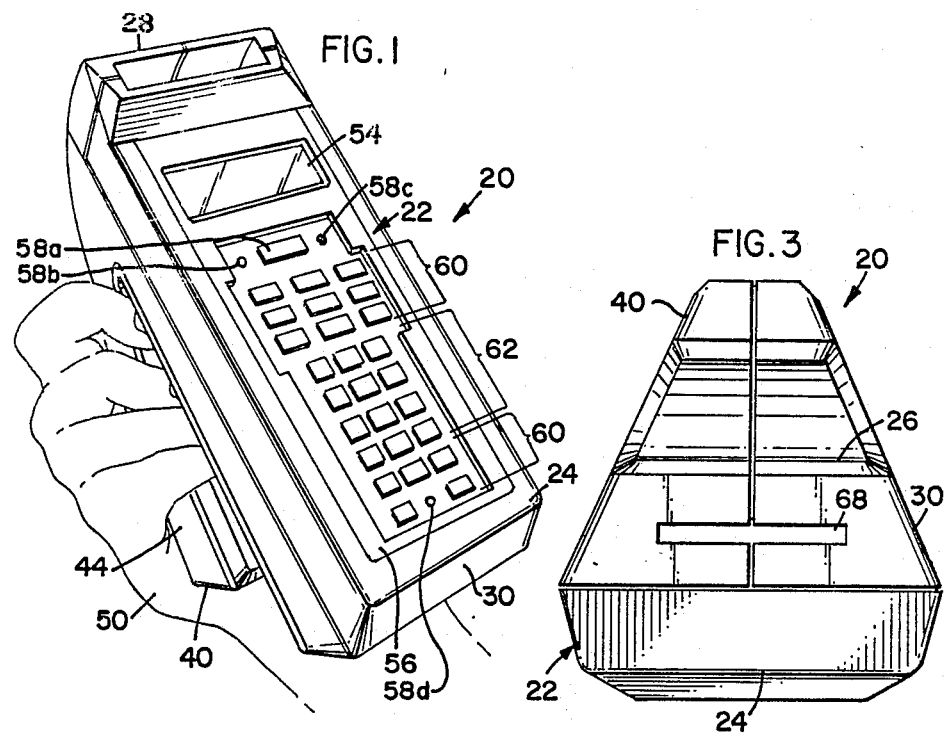
FIG. 1
FIG. 3
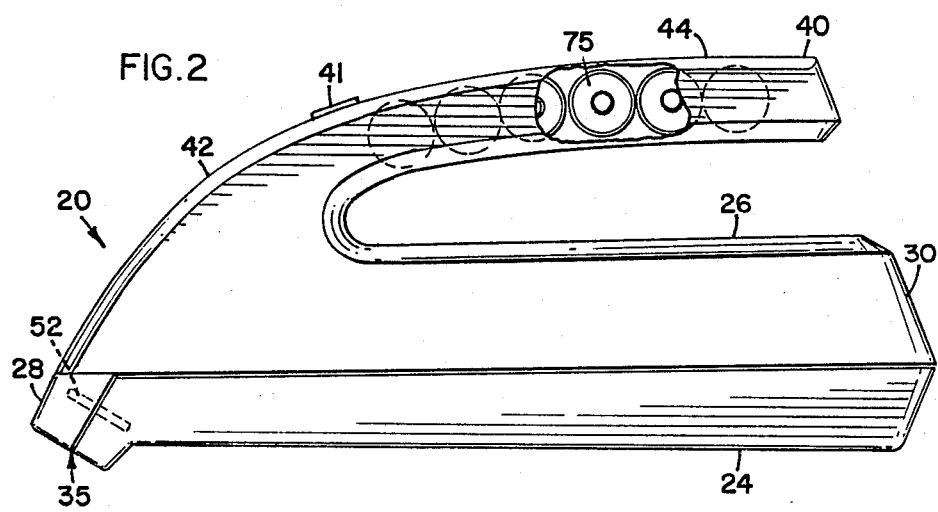
FIG. 2

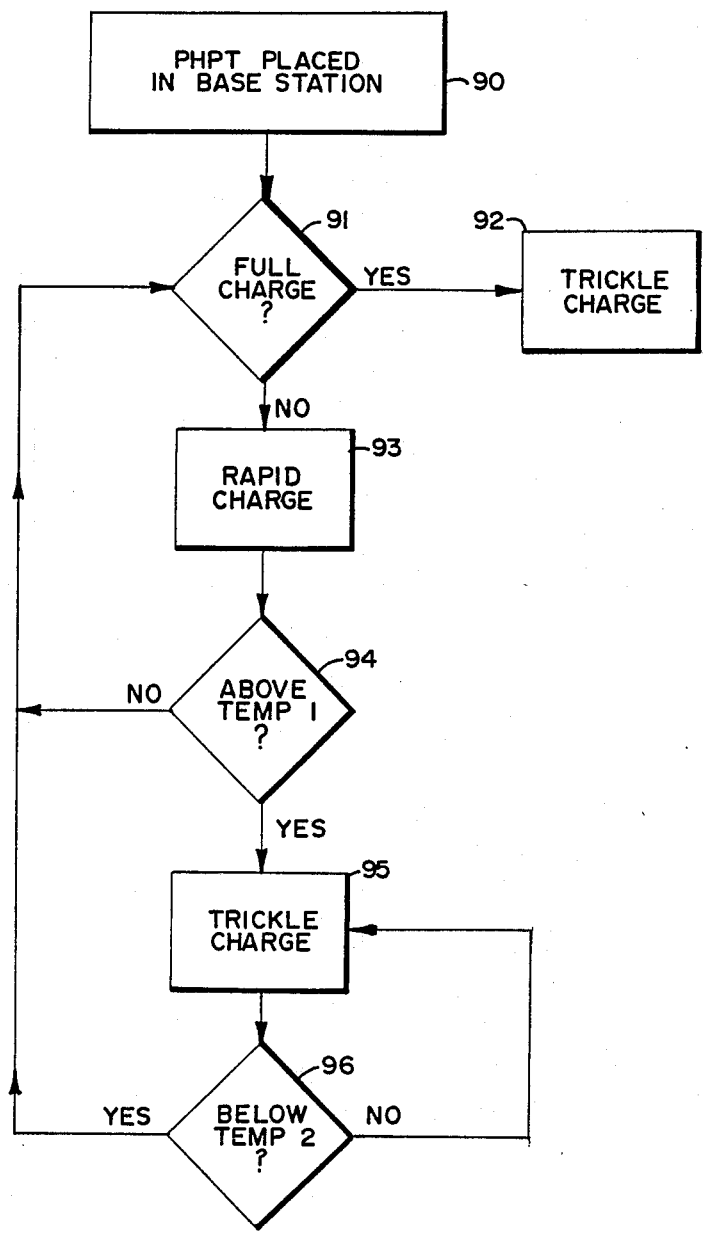

PORTABLE HANDHELD TERMINAL INCLUDING OPTICAL BAR CODE READER AND ELECTROMAGNETIC TRANSCEIVER MEANS FOR INTERACTIVE WIRELESS COMMUNICATION WITH A BASE COMMUNICATIONS STATION

This is a continuation of application Ser. No. 862,149 filed May 12, 1986, now abandoned.

BACKGROUND OF THE INVENTION

The present invention relates to a portable handheld terminal. More particularly, the present invention relates to a portable handheld terminal having integrated keypad, display, and optical bar code reader functions and further including electromagnetic transceiver means for wire less transmission of data to and from a base communications station. Additionally, the present invention relates to a portable handheld terminal having a novel handle design which facilitates ease of use.

There are portable bar code readers available on the market which provide for the collection of data for later downloading at a computer terminal. An example of such a bar code reader is one used to take inventory. The bar code reader will typically include memory for storage of the inventory data and a communications port for later downloading of the inventory data at the computer terminal. Such bar code readers do not provide for interactive functioning with a computer system in full duplex fashion, i.e., enabling communication to and from the computer system. Some bar code readers have been installed as a part of a microcomputer, e.g., by addition of a printed circuit board in one of the microcomputer's available slots. While this provides a bar code reader which can interactively communicate with the microcomputer, it does not provide for a bar code reader which is readily portable and can be hand carried by the user to the application site wherein the interactive processing and collection of data is to occur. The bar code reader is physically wired or interconnected to the microcomputer and while the terminal may indeed be somewhat transportable from one location to another, it is not intended for hand carried use. Typical use of such a bar code reader and microcomputer arrangement might be that of a retail store such as a grocery store wherein items are being sold at a check-out counter.

Additionally, many bar code readers are not used in conjunction with integrated keyboard and display functions wherein the user can control operation of the bar code reader by use of the keyboard and wireless interactive communication with a main computer system.

In bar code reading, a light source is typically used to illuminate a bar code, which is a series of printed bars of various widths and spacing. An optical detector "reads" the reflections from the bars and identifies them as a code or number. A typical example of this technique is found at supermarkets, where a product's bar code is scanned and billed as it passes over the bar code reader at the checkout counter. During the bar code reading process, the bar code is "scanned" by causing relative movement between the bar code and the bar code reader. The bar code reader might be moved relative to the bar code, or the bar code might be moved relative to the bar code reader. The "scanning" of the bar code is necessary since the optical detector has a very limited range of detection along the X-axis or direction of movement or "scanning".

Two types of optical technologies often used in bar code readers are the light emitting diode (LED) and the laser. Because of their lower costs, relatively low power requirements, and safety, LEDs are more commonly used. However, due to the fact that LEDs emit a relatively low light level, bar code readers using LEDs must be held closer to the bar code and are often referred to as "contact" bar code readers. Contact bar code readers will typically use a bar code wand which is held in contact with the bar code and then move relative to the bar code. Lasers emit a higher level of light, and thus bar code readers using such technology can scan a bar code without making contact with the bar code. These bar code readers are often referred to as "non-contact" bar code readers.

Contact bar code readers are difficult to use on other than flat surfaces. Non-contact bar code readers are rather focal specific and require a rather uniform scan rate and uniform distance between the bar code and the optical detector of the bar code reader. In addition, lasers can present health risk and may be unsafe for use in various industries, particularly the health care industry. Also, lasers consume relatively more power and are relatively expensive when compared to LEDs.

The present invention solves these and many other problems associated with currently existing bar code readers.

SUMMARY OF THE INVENTION

The present invention relates to a portable handheld terminal including integrated keyboard, display, and optical sensor functions. The portable handheld terminal includes a housing with a keyboard means and display means disposed thereon. An optical sensor means is further disposed in the housing for sensing bar code indicia on an object. An electromagnetic transceiver means is associated with the housing for transmitting and receiving electromagnetic signals. Control means including programmed microprocessor and memory means contained in the housing controls operation of the portable handheld terminal. Power supply means is provided for powering the portable handheld terminal.

It is an object of the present invention to provide a microprocessor controlled portable handheld terminal including integrated display, keyboard, bar code reader, and electromagnetic transceiver functions. The portable handheld terminal is capable of interactive wireless communication with a computer system. Moreover, movement of the portable handheld terminal is not restricted by any electrical cords or other physical wiring. The portable handheld terminal communicates with the computer system under operator control in interactive fashion, whereby the portable handheld terminal serves as a full function terminal with wireless duplex transmission enabling use of the portable handheld terminal in the field where interactive data processing and collection is to occur.

Input to the portable handheld terminal can be accomplished by use of the bar code reader, the keyboard, and the electromagnetic transceiver.

Still another object of the present invention is to provide a portable handheld terminal which has a novel design facilitating use. The preferred embodiment includes a novel handle structure for holding the portable handheld terminal which does not interfere with use of the keyboard and the display, and further allows the operator to use either hand when holding the portable handheld terminal. The handle is preferably positioned on a side of the portable handheld terminal opposite that of the display and keyboard functions.

In a preferred embodiment of the present invention, an actuator switch is positioned on a surface of the handle for activating the bar code reader function.

It is an object of the present invention to integrate a bar code reader function with a plurality of other functions so as to provide a portable handheld terminal which can be utilized in an interactive, real time fashion in an operational environment. The microprocessor controlled portable handheld terminal of the present invention collects and transmits data under operator control to a central computer system by use of an electromagnetic transceiver arrangement which does away with the need for any interconnecting wires. In the preferred embodiment, an RF transceiver is used. Moreover, the portable handheld terminal provides for user control of operation via use of a keyboard and display.

The present invention also relates to a portable handheld terminal including optical bar code reader apparatus including a binary imaging sensor means for sensing bar code indicia in both X and Y directions, whereby the bar code reader is self-scanning; i.e., the bar code reader need not be moved relative to the bar code indicia, the bar code reader functioning to take an electronic digital "picture". The portable handheld terminal includes keyboard means disposed on a housing of the portable handheld terminal for entering data and display means disposed on the housing of the portable handheld terminal for displaying data. Control means is interconnected to the keyboard means, the display means, and the binary sensor means for controlling operation of the portable handheld terminal.

Yet another object of the present invention is that it provides a portable handheld terminal with bar code reader which is self-scanning. An electronic binary imaging sensor enables the bar code reader to self-scan the bar code indicia in both the X and Y directions. The bar code reader does not have to be moved relative to the bar code in order to read the bar code indicia. The user simply positions the binary imaging sensor over the bar code to be read and activates the sensor which takes a digital "picture" of the bar code. The digital "picture" is then processed by appropriate digital processing techniques. In addition, contact between the bar code reader and the bar code is not required. The present invention is particularly useful for reading bar codes on curved surfaces as well as flat surfaces. In addition, the bar code reader of the present invention can be used to read characters as well as bar codes. In the preferred embodiment, the bar code reader has been designed to discriminate between different bar code standards, e.g., codabar, code 3 of 9, Interleave 2 of 5, UPC, etc.

Yet another object of the present invention is that it provides a bar code reader which is safe and easy to use.

Still another objective of the present invention is to provide a bar code reader which can read a high density of characters, e.g., more than twelve characters per line, and narrow bar widths; e.g., less than five mm at one cm.

It is an object of one embodiment of the present invention to include a rechargeable power supply which can be recharged when not in use. In one embodiment, this is accomplished by use of a wall mounted base station including recharging circuitry. The recharging circuitry will monitor power supply temperature so as to not overheat the power supply and will include a rapid charge and trickle charge mode. When the power supply is fully charged, the recharging circuitry will maintain a trickle charge continuously.

It is an object of another embodiment of the present invention to provide the portable handheld terminal with an RF transceiver for receiving and transmitting data. In one embodiment, the base unit will include an RF transceiver for transmitting and receiving data to and from the portable handheld terminal. In the preferred embodiment, the portable handheld terminal and the base unit are capable of full duplex operation.

It is an object of yet another embodiment of the present invention to provide a base station and portable handheld terminal which are uniquely addressable, the base unit only communicating with a portable handheld terminal having the same address. In yet another embodiment, the base unit is capable of reprogramming the portable handheld unit with a new address when stored therein.

It is another object of the present invention to provide a portable handheld terminal which enables information entry, storage, and distribution to a central computer system from a remote site where the user's activities occur. Moreover, the portable handheld terminal allows system-wide information to be retrieved and reviewed almost instantly by the user at the remote site.

Yet another object of one embodiment of the present invention is the provision of a communications port in the portable handheld terminal enabling data stored in the portable handheld terminal to be downloaded at a base station or other terminal electrically interconnected or hardwired to the computer system. Additionally, in the preferred embodiment, when the portable handheld terminal is positioned in the base station, the communications port provides for recharging of the portable handheld terminal's power supply by recharging circuitry of the base station, enables diagnostic testing of the portable handheld terminal to be conducted by the computer system, and allows programming of either the portable handheld terminal or the base station with a unique address. In the preferred embodiment, only portable handheld terminals and base stations having corresponding addresses will communicate with each other.

The preferred embodiment of the portable handheld terminal includes visual and audible indicators monitoring operation thereof.

Yet another object of one embodiment of the present invention is to provide a base station including electromagnetic transceiver means for communication with the portable handheld terminal. In addition, the base station is preferably hardwired to the computer system by telephone wires and includes DOV modem means for communication over the telephone wires to DOV modem means at the computer system. Accordingly, the base stations can be installed throughout a facility using existing telephone wiring which greatly simplifies the installation process and significantly reduces the overall cost.

These and various other advantages and features of novelty which characterize the invention are pointed out with particularity in the claims annexed hereto and forming a part hereof. However, for a better understanding of the invention, its advantages and objects obtained by its use, reference should be had to the drawings which form a further part hereof, and to the accompanying descriptive matter in which there is illustrated and described a preferred embodiment of the invention.

BRIEF DESCRIPTION OF THE DRAWINGS

In the drawings, in which like reference numerals and letters indicate corresponding parts throughout the several views, FIG. 1 is a perspective view of an embodiment of a portable handheld terminal including optical bar code reader in accordance with the principles of the present invention while being handheld in a user's hand;

FIG. 2 is a side elevational view of the portable handheld terminal shown in FIG. 1 with portions being broken away for purposes of illustration;

FIG. 3 is a back end elevational view of the portable handheld terminal shown in FIG. 1;

FIG. 8 is a block diagram of one embodiment of temperature sensor arrangement relative to recharging circuitry and rechargeable power supply;

FIG. 9 is a block diagram of one embodiment of charging procedure; and

DETAILED DESCRIPTION OF A PREFERRED EMBODIMENT

Figure 4:
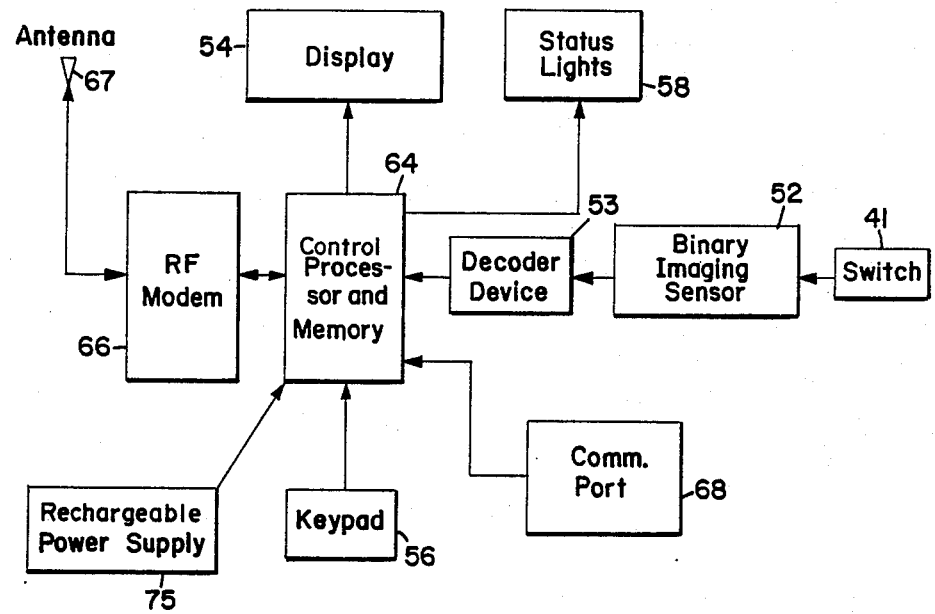
FIG. 4 is a block diagram of one embodiment of a portable handheld terminal in accordance with the principles of the present invention.

In view of the fact that the portable handheld terminal of the present invention has particular utility in a healthcare setting, it will be referred to in the detailed specification as a portable handheld patient terminal (PHPT). However, this nomenclature should not be construed as by any means limiting the present invention to a particular application.

Referring now to the drawings, there is illustrated an embodiment of a portable handheld terminal 20 in accordance with the principles of the present invention. As illustrated, the portable handheld terminal 20 is packaged in a portable handheld housing 22 having first and second spaced apart, opposing major surfaces 24, 26, respectively, extending generally along the longitudinal axis of the portable handheld terminal 20 between first and second end portions 28 and 30, respectively. The first major surface 24 might also be referred to as the bottom surface, and the second major surface 26 might also be referred to as the top surface. The first end portion 28 might also be referred to as the front end portion, and the second end portion 30 might also be referred to as the back end portion. As illustrated, interconnected to the housing 22 proximate the first end portion 28 is an elongated handle portion 40 which extends upwardly away from the second major surface 26 and backwardly generally along the longitudinal axis of the housing 22 toward the second end portion 30. As illustrated, in the embodiment shown, the handle portion 40 includes an arcuate portion 42 and a substantially straight portion 44 which is spaced sufficiently far from the second surface 26 of the portable handheld terminal 20 so as to enable a user's hand 50 to grasp around the handle portion 40 with the user's fingers extending into the space between the handle portion 40 and the second major surface 26 as illustrated in FIG. 1. The handle portion 40 enables the terminal to be held in either hand during use. In an alternate embodiment, the handle portion 40 might be interconnected to the housing at both ends. The portable handheld terminal will preferably be made by conventional molded plastic processes.

As illustrated in FIG. 3, when seen from the back end portion 30, the portable handheld terminal 20 has a generally truncated pyramid shape, generally becoming narrower toward the top.

Figure 5:
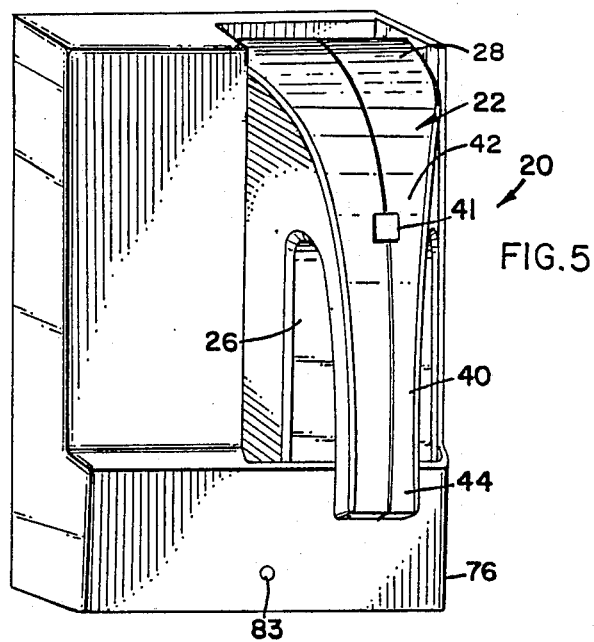
FIG. 5 is a perspective view of the portable handheld terminal shown in FIG. 1, mounted in a base station.
Figure 10:
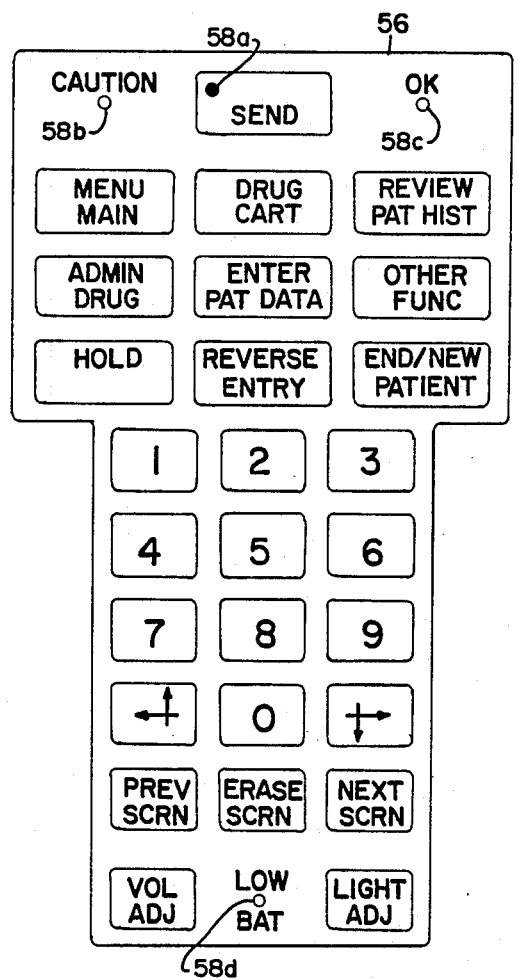
FIG. 10 is an embodiment of a keyboard arrangement of the portable handheld terminal.

As illustrated in phantom line in the embodiment shown in FIG. 2, located proximate the first end portion 28 of the portable handheld terminal 20 is an optical sensor device 52 of a bar code reader. As illustrated in FIG. 5, positioned on the handle 40 is a push button, contact switch 41 for activating the sensor device 52 via an appropriate electrical interconnection. The switch 41 will normally be in an off position and will return to the off position upon being released by the user. Disposed on the first major surface 24 is a liquid crystal display (LCD) 54 which in the embodiment shown is capable of displaying four lines of text, each line containing up to twenty characters. Also disposed on the first major surface 24 is a keyboard 56. In the preferred embodiment, a membrane keypad is used. An embodiment of the keyboard is illustrated in FIG. 10. In the embodiment shown, the keyboard 56 includes status lights 58, special function keys 60, and a numeric keypad 62.

As illustrated in the block diagram shown in FIG. 4, the portable handheld terminal 20 includes a microprocessor and associated memory 64. An example of one such microprocessor is an INTEL 3031. In addition, the portable handheld terminal includes an RF transceiver arrangement including an RF modem 66 and antenna 67 for real time data transmission and reception of RF signals. Moreover, a communications port 68 including a multipin connector is present for input of data to and output of data from the portable handheld terminal 20. The portable handheld terminal 20 is provided with additional memory so as to enable storage of data and downloading at a later time via the communications port 68. For example, the portable handheld terminal 20 might store vital signs, drugs administered, etc. for a plurality of patients. In addition, external vital signs measurement equipment might be interconnected to the communications port 68 for input of data. The communications port 68 includes a multipin connector. In addition to input and output of data, the communications port 68 will also be used in the preferred embodiment for charging a rechargeable, removable power supply 75 of the portable handheld terminal 20. In the preferred embodiment, the portable handheld terminal 20 will operate for over one hour between recharging.

The optical sensor device 52 is preferably a binary imaging device such as a charged coupled device or optic RAM device; e.g., Hitachi Model No. HE97134. The optical sensor device 52 includes an optical lens and a low-powered, high sensitivity light source 55 for illumination of the bar code indicia. The optical sensor device 52 includes an image capture device including an X-Y array of light sensitive elements; e.g., a 2048 pixel array of light sensitive elements, which will provide a digital image of the bar code indicia being read. Accordingly, the present invention will simply require the user to point the optical sensor device 52 of the portable handheld patient terminal 20 at the bar code indicia and press the switch 41 on the handle portion 40 to take an electronic digital "picture" of the bar code indicia. The electronic digital "picture" is then electronically interpreted by a microprocessor controlled decoder device 53. It will be appreciated that charged coupled devices and optic RAM devices are commercially available.

As illustrated in FIGS. 5-9, the portable handheld terminal 20 is used in conjunction with a wall mounted base station 76 for wireless communication with the portable handheld terminal and for storage of the portable handheld terminal 20 during non-use. The base station in the embodiment shown, includes an RF transceiver arrangement including an RF modem 79 and antenna 80 for communicating with the RF transceiver arrangement of the portable handheld terminal 20. The base station 76 further includes a data over voice (DOV) modem 77 for data over voice communications over telephone wire to a computer system. In addition, the base station 76 will include a central processor and memory 73 for controlling operation of the base station 76 and in particular handling the communication interface between the DOV modem 77 and the RF modem 79, as well as communication with the computer system. The base station 76 preferably derives its power from a transformer 81 interconnected to an AC power supply. In addition, the base station 76 includes a communications port 72 adapted for interconnection to the communications port 68 of the portable handheld terminal 20.

The base station 76 includes non-volatile memory 86 which can be programmed to uniquely address the base station 76. When the portable handheld terminal 209 is stored at the base station 76, the base station 76 will download its unique address or identifier via the communications ports 82,68 into the memory of the portable handheld terminal. When transmitting to the base station 76, the portable handheld terminal 20 will include this address or identifier with its transmissions. If the identifier is not recognized by the base station 76, the base station will ignore the transmission and not respond. This prevents interference with the base station 76 by other portable handheld terminals 20 located throughout the facility. In a preferred embodiment, the portable handheld terminal is capable of programming the address or identifier of the base station 76. This is accomplished by the operator entering an appropriate command at the keyboard of the portable handheld terminal which is recognized by the base station and indicates to the base station that its address is to be modified by the portable handheld terminal 20. When the portable handheld terminal 20 is stored in the base station 76, the unique address or identifier will be downloaded from the portable handheld terminal to the non-volatile memory 86 of the base station.

As illustrated, the base station 76 includes recharging circuitry 78 for charging the rechargeable power supply 75 of the portable handheld terminal 20. As illustrated in FIG. 8, the recharging circuitry 78 is interconnected by a temperature sensor, a read relay 71, mounted to a battery cell in the rechargeable power supply 75 of the portable handheld terminal 20. The read relay 71 is mounted so as to provide sensing of the highest temperature in the battery pack. The relay 71 will have one lead connected to the positive terminal of the battery pack and the other lead provided to the recharging circuitry 78 through the communication ports 68,82. In operation, as illustrated in FIG. 9, when the portable handheld terminal is placed in the base station as illustrated at block 90, the base station 76 will check to see if the power supply 75 is at full charge as illustrated at decision block 91. If the power supply is at full charge, the recharging circuitry 78 will switch to a trickle charge mode as illustrated at block 92. In the trickle charge mode, the recharging circuitry 78 will provide power to the logic control of the portable handheld unit. As illustrated at block 93, if the power supply 75 is not fully charged, the recharging circuitry 78 will provide a rapid charge. In the preferred embodiment, rapid charge current is at 2C=900 mA while trickle charge is at C/3=150 mA. The recharging circuitry 78 will check to see if the power supply 75 has reached a critical temperature (Temp1) as illustrated at block 94. If the critical temperature has been reached, then, as illustrated at block 95, the recharging circuitry 78 will switch into trickle charge mode. The recharging circuitry 78 will monitor the temperature such that if the temperature falls below a specified temperature (Temp2) as illustrated at block 96, the recharging circuitry 78 will go back to rapid charge mode if the power supply is not fully charged.

Mounted on the outside of the base station 76 is a status light 83 which varies in intensity between trickle charge and rapid charge so as to indicate the charging mode. The status light 83 will come on as soon as the portable handheld terminal 20 is properly inserted in the base station 76.

Figure 7:
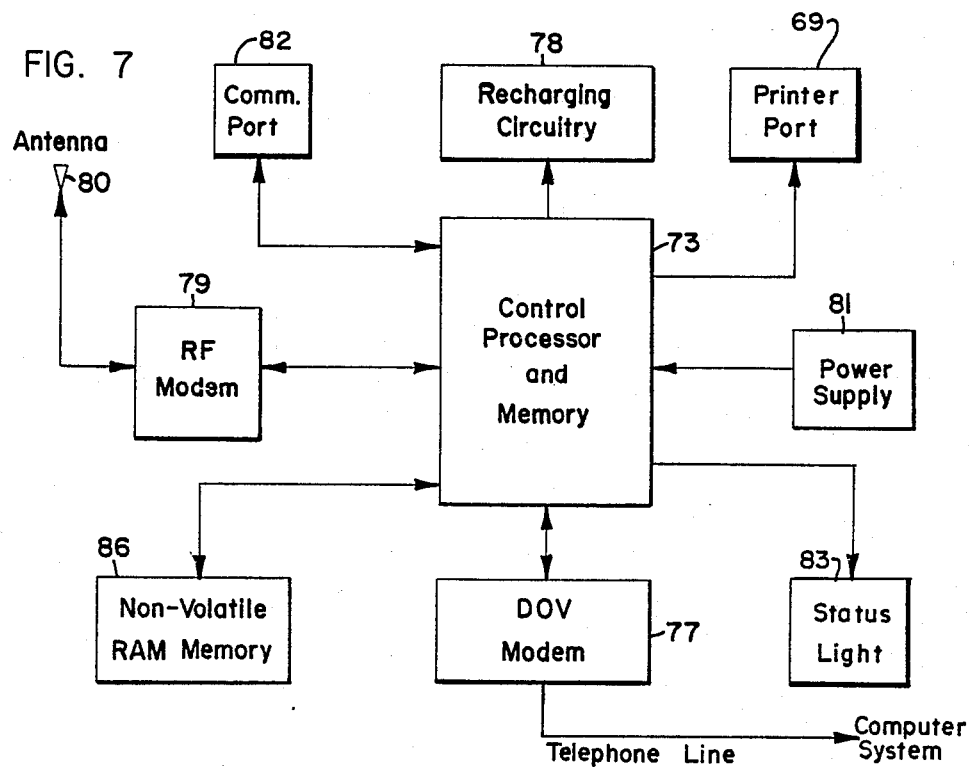
FIG. 7 is a block diagram of one embodiment of the base station.

The power supply 81 will preferably provide the following power outputs:
400 mA at +5.0 V
80 mA at +7.2 V
100 mA at +12 V
100 mA at −12 V In addition, as illustrated in FIG. 7, the base station 76 might include a communications port 69 for interconnection to a printer.

The power supply 75 in the portable handheld terminal might include removable batteries or a removable battery pack stored in the handle portion 40 or between the surfaces 24,26 approximate the end portion 30.

As previously indicated, electrical interconnection between the portable handheld terminal 20 and the base station 76 will be provided by the communications ports 68,82 which might comprise a standard multipin type of interface connector. In addition to use for recharging and addressing of the portable handheld terminal 20, the communication ports might be utilized for diagnostic testing of the portable handheld terminal 20.

Figure 6:
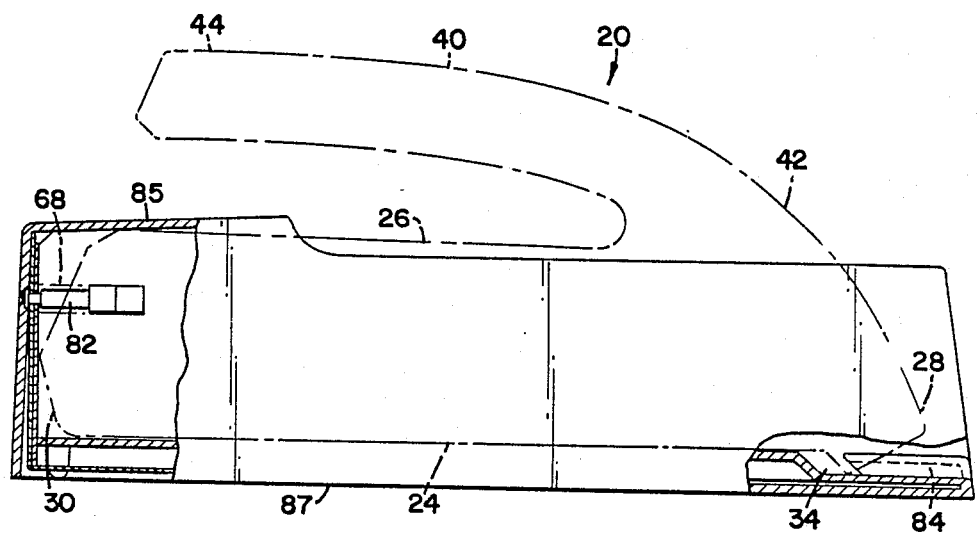
FIG. 6 is a side view of the base unit and its respective portable handheld terminal mounted thereon.

Although not shown, the base station 76 might include a biasing mechanism for forcing the portable handheld terminal 20 in a generally upward direction such that an edge 84 of the base station 76 cooperates with an inside wall 34 of the portable handheld terminal housing portion defining a window or opening 35 for an optical sensor 52. As illustrated in FIG. 6, a wall 85 of the base station 76 might cooperate with a back wall 87 to define a cavity for receipt and retention of the back end portion 30 of the portable handheld terminal 20. The wall 85 slants at a slight angle away from the wall 87 so that the portable handheld terminal 20 can be inserted downwardly with low insertion force into proper connection with the multiple pin connector of the communications port 82 and tilted outwardly to enable easy mounting and removal thereof from the base station 76. The mating connector arrangements of the communication ports 68,82 are capable of being connected numerous times.

The base station 76, in addition to communicating over existing telephone wiring, might communicate via twisted pair wiring in a serial interface fashion, as part of a local area network, or over the existing AC wiring using power line carrier (PLC) techniques, etc.

In typical use, the user will enter data at the handheld portable terminal 20 via the keyboard 56 and the optical bar code reader 52 and transmit the same as RF signals to the base station 76. The base station 76 will then communicate with the central computer system wherein master data files might be kept. The central computer system will, upon receiving the data, respond and provide output data to the base station 76 which will, in turn, communicate by RF signals to the portable handheld terminal 20.

It will be appreciated that other forms of electromagnetic transmissions might be utilized other than radio frequency (RF) transmissions, e.g., infrared.

The keypad of the portable handheld patient terminal 320 will allow the operator to select the function desired, allow manual entry of information, and control the operation of the handheld terminal. An audible alarm sounds if an invalid key is pressed. Also, an indication will be displayed at the LCD indicating that an invalid key was pressed. This screen will be shown for a period of time and then the portable handheld patient terminal will display the screen that was shown before the invalid key was pressed. During communications with the base station 376, the keys on the portable handheld patient terminal 320 will not function.

Access to any function via the keyboard can only be accomplished by reading of a hospital staff ID badge after the portable handheld patient terminal 20 is removed from the base station 76 or after the "new patient" key is depressed. The liquid crystal display will display to the user an indication to scan their ID badge. After a valid scan of their ID badge, the portable handheld patient terminal will be in the main menu for function selection. Access to the system has now been gained. Once access is gained, the ID number of the staff person is retained until access to functions is cancelled. When a function requiring patient ID or drug cart ID is requested, the portable handheld patient terminal 20 will prompt the user to scan the appropriate bar code, if it has not already been entered. The patient ID or drug cart ID can be entered before the function selection is made. Once entered, all IDs are retained until access to functions is cancelled. Access to functions is done whenever the functions for a particular patient or drug cart are complete. This is accomplished by depressing the "end/new patient" key or placing the portable handheld patient terminal into the base station 76. In a preferred embodiment, the access to functions is cancelled thirty seconds after the portable handheld patient terminal is placed into the base station. Once this is done, the portable handheld patient terminal goes into an inoperative mode except for diagnostics which might be initiated by the computer system. Even though the portable handheld patient terminal has not been placed back in the base station, if there have been no valid functions performed for a period of five minutes, access to the system functions via the portable handheld patient terminal is cancelled. This is to avoid unauthorized personnel access if the staff personnel forget to press the "end/new patient" key. The staff ID, drug cart ID, and patient ID will be removed from the memory of the portable handheld patient terminal when access to functions is cancelled. If a function is in process when the "end/new patient" key is pressed, an audible alarm will sound. The portable handheld patient terminal can only be turned off by pressing the "end/new patient" key when in the main menu. Data design to be entered via bar codes, e.g., staff ID numbers, patient ID numbers, supplies identification, drug identification, drug cart identification, etc. cannot be entered via the keypad 56. Patient data such as vital signs, patient assessments, etc. can be entered via the keypad, as well as quantity items.

The following is a brief description of the various keys of the keypad 56:

| KEY | DESCRIPTION |
| --- | --- |
| MAIN MENU | The "MAIN MENU" key can be used any time after a function has been selected. The portable handheld patient terminal 20 will be in the mode as when it was first accessed. Staff ID, cart ID, and patient ID will be retained in the portable handheld patient terminal 20. When the "MAIN MENU" key is pressed, the LCD display will display a message to the operator. It will indicate that any data entered for the function they are in will be lost if it is not sent to the base station 76 and thence to the computer system before the "MAIN MENU" function is carried out. It will allow the operator to either go back to the function they were in, or go ahead with the "MAIN MENU" selection. |
| END/NEW PATIENT | The "END/NEW PATIENT" key will cancel access to functions. |
| ERASE SCRN | The "ERASE SCRN" key will erase all the data which had been entered, either manually, automatically, or with the bar code reader, that is presently shown on the LCD display. |
| SEND | The "SEND" key is used in conjunction with the other keys to perform |

-continued

| KEY | DESCRIPTION |
|---|---|
| | a function. When the send key is pressed, data about the function desired to be performed is sent to the computer system via the base station 76. If the "SEND" key is accepted for input, a yellow LED 58a on the "SEND" key is lit. The use of the portable handheld patient terminal when the RF transceiver is inoperable is possible. This would be done by returning the portable handheld patient terminal 20 to the base station 76 after the "COMMUNICATIONS ERROR" message has been displayed on the LCD display 54. The amount of time between when the "COMMUNICATIONS ERROR" message has been displayed on the LCD display 54 and when the portable handheld patient terminal 20 is returned to the base station 76 is limited to 30 seconds. When a response is received from the host computer system, the time out feature is started again. The audible alarm will indicate to the operator that the communications to the host computer system is complete. If the portable handheld patient terminal is to be used again, such as for another function or to correct a red light condition, the timeout will be 30 seconds. The portable handheld patient terminal will have to be removed from the base before this happens. |
| HOLD | The "HOLD" key can only be used in specified functions. It will give the staff member the ability to hold a test order, surgical order, or a drug administration. The hold feature will give the option of: Delaying the time for the procedure/administration and the associated warnings that are given when they are late. This delay is determined by the application software of the host computer system. Not giving a particular order/prescription for one administration from the MAR. This is done if it is determined that the procedure/administration will not be done at a later time. |
| REVERSE ENTRY | The "REVERSE ENTRY" key can only be used in specified functions. It will give the staff member the ability to undo a function which was previously recorded, (sent to the host computer system) in the host computer system such as: When a drug had been recorded as administered to a patient, but is not given. When test samples had been recorded as taken from a patient, but are not. When supplies had been recorded as used by a patient, but are not. When controlled drugs have been recorded for cart replenishment, but are not delivered. When controlled drugs checked out by a staff member need to be returned to the drug cart. The "REVERSE ENTRY" key will place a |

-continued

| KEY | DESCRIPTION |
|---|---|
| | minus (—) in front of the quantity field on the LCD display. |
| PREV SCRN | The "PREV SCRN" key can be used in functions which contain more than one screen of information. This key will allow the operator to view screens of information entered prior to the screen presently displayed. This feature will be useful in reviewing patient vital signs and patient patient assessments which were recalled from memory, as well as reviewing data entered before it is sent. |
| NEXT SCRN | The "NEXT SCRN" key can be used in functions which contain more than one screen of information. This key will allow the operator to view screens of information entered after than the screen presently displayed. This feature will be useful in reviewing patient vital signs and patient assessments which were recalled from memory, as well as reviewing data entered before it is sent. |
| (RIGHT ARROW) | The "(RIGHT ARROW)" key is used to move the cursor on the LCD display to the various fields for data entry. By pressing this key, the cursor will move to the first character location in the next field to the right, on the same line. If there are no more fields on the same line, the cursor will move to the left most field on the next line. If the cursor is in the last field on the last line, it will wrap around to the first field on the first line. If there is already data in a field, entering any bar code or numeric key when the cursor is at the first character will erase the previous data and allow for the new data to be entered. |
| (LEFT ARROW) | The "(LEFT ARROW)" key is used to move the cursor on the LCD display to the various fields for data entry. By pressing this key, the cursor will move to the first character location in the next field to the left, on the same line. If there are no more fields on the same line, the cursor will move to the right most field on the previous line. If the cursor is in the first field on the first line, it will wrap around to the last field on the last line. If there is already data in a field, entering any bar code or numeric key when the cursor is at the first character will erase the previous data and allow for the new data to be entered. While entering data in a field, pressing the left arrow key will provide for editing of the data. It will function as a backspace key, and the characters will be erased from the field as the key is pressed. If all characters in a field are erased by using the left arrow as a backspace, the cursor jumps to the first character in the previous field. |
| ENTER PAT DATA | The "ENTER PAT DATA" is used to enter patient vital signs and patient assessment. In the preferred embodiment, the formatted |

| KEY | DESCRIPTION |
|---|---|
| | display will be presented at the liquid crystal display for entry of the vital signs and patient assessment. |
| REVIEW PAT HIST | The "REVIEW PAT HIST" key is used to review patient vital signs and administrations. |
| DRUG CART | The "DRUG CART" key is used to replenish and check out controlled drugs from the drug cart, and verify the drug cart inventory of controlled drugs. |
| ADMIN DRUG | The "ADMIN DRUG" key is used for patient and drug verification for drug administration. |
| OTHER FUNC | The "OTHER FUNC" key is used for patient and sample verification for taking of samples, billing for patient use of supplies, checking a patient into a new location, and displaying other functions which might be available on the system. |

There are four LED indicators on the portable handheld patient terminal 320. The liquid crystal display (LCD) 354 will also provide information relating to the LEDs. The yellow LED 358a will be lit when the SEND key is pressed and will remain lit until communications with the base unit is complete. During this time, the user cannot make any entries at the keyboard. A red LED 358b is let when information entered for a function desired does not match what is the correct information for that function, or when an invalid key is pressed. The red LED 358b is a warning not to proceed without first checking for a potential problem. Under the second condition, the red LED will remain lit while the LCD displays the invalid key pressed message. A green LED 358c is lit when a function is valid to proceed. The green LED is lit momentarily under this condition. The green LED is also lit when the central computer system acknowledges receipt of proper information. The green LED is lit continuously under this condition until some other action is taken. A yellow LED 358d will indicate the early warning of a low battery in the portable handheld patient terminal. This is an early warning level and the portable handheld patient terminal will still function. However, operation of the portable handheld patient terminal will be locked out when the batteries reach a level where the data in the patient history is corrupted. Before lock out occurs, the LCD display 354 will display a warning.

Preferably, the LCD display 354 will be capable of displaying four lines of text each containing twenty characters. The LCD will have a lighting source which will provide illumination under low light conditions. This lighting will be controlled by a key on the keypad switching the lighting source from the on to off or off to on condition. If the light source is on when the portable handheld patient terminal is returned to the base unit, it will automatically be turned off.

The preferred embodiment of the portable handheld patient terminal 320 will also make use of audible tones to a limited extent and include means to disable the audible tones. It will be appreciated that there are a number of situations wherein an audible tone or alert could be utilized. For example, (1) a single beep when a valid bar code read occurs, (2) three beeps when the red LED is lit, (3) three beeps when invalid key pressed, (4) three beeps when a bar code is successfully read but the data contained in the bar code does not meet the requirements for the field being displayed on the LCD display 354, etc.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A portable handheld terminal, comprising:
   (a) a housing;
   (b) keyboard means disposed on the housing for entry of data;
   (c) display means disposed on the housing for display of data;
   (d) optical sensor means disposed in the housing for sensing bar code indicia on an object;
   (e) electromagnetic transceiver means contained in the housing for transmitting and receiving electromagnetic signals representing the exchange of data between the portable handheld terminal and a remote location while the portable handheld terminal is in use, said electromagnetic transceiver means including means for initiating transmissions to the remote location;
   (f) control means contained in the housing operatively interconnected to the keyboard means, display means, optical sensor means, and electromagnetic transceiver means for controlling operation of the portable handheld terminal; and
   (g) power supply means for powering the portable handheld terminal.

2. An apparatus in accordance with claim 1, further including elongated handle means interconnected to the housing for holding the housing, the elongated handle means extending generally along a surface of the housing opposite that of the keyboard means and display means, the elongated handle means being displaced from the surface of the housing along a portion of its length whereby the elongated handle means can be grabbed by a user's fingers extending through an opening formed between the elongated handle means and the housing.

3. An apparatus in accordance with claim 2, wherein the elongated handle means is interconnected to a first end portion of the housing and extends back longitudinally toward a second end portion of the housing.

4. An apparatus in accordance with claim 3, wherein the elongated handle means includes a first arcuate portion interconnected to the housing and a second substantially linear portion spaced apart from the surface of the housing.

5. An apparatus in accordance with claim 4, wherein the elongated handle means is formed of one piece with the surface of the housing.

6. An apparatus in accordance with claim 1, wherein the optical sensor means includes binary imaging means including a plurality of imaging elements arranged in an X-Y configuration for sensing the bar code in both the X and directions, whereby the optical sensor means is self-scanning.

7. An apparatus in accordance with claim 6, wherein the binary imaging means includes a charged coupled device and supporting electronics.

8. An apparatus in accordance with claim 6, wherein the binary imaging means includes an optical RAM sensor and supporting electronics.

9. An apparatus in accordance with claim 6, wherein switch for activating the binary imaging means is positioned on the surface of the elongated handle means facing away from the surface of the housing.

10. An apparatus in accordance with claim 1, wherein the optical sensor means is located proximate one of first and second longitudinally spaced apart end portions of the housing.

11. An apparatus in accordance with claim 1, wherein the power supply means is removable.

12. An apparatus in accordance with claim 1, wherein the power supply means is rechargeable.

13. An apparatus in accordance with claim 1, wherein the electromagnetic transceiver means includes RF transceiver means.

14. An apparatus in accordance with claim 6, wherein the binary sensor means includes an array of sensor elements positioned in a planer arrangement, sensor means being associated with the housing.

15. A portable handheld terminal, including:
   (a) a portable handheld terminal, including:
       (i) a housing having first and second spaced apart, opposing major surfaces extending longitudinally of the housing between first and second end portions;
       (ii) keyboard means disposed on the first surface for entering data;
       (iii) display means disposed on the first surface for displaying data;
       (iv) optical sensor means disposed in the housing for sensing bar code indicia;
       (v) RF transceiver means contained in the housing for transmitting and receiving RF signals representing the exchange of data between the portable handheld terminal and a remote location while the portable handheld terminal is in use, said RF transceiver means including means for initiating transmission to he remote location;
       (vi) control means contained in the housing and operatively interconnected to the keyboard means, display means, optical sensor means, and RF transceiver means for controlling operation of the portable handheld terminal; and
       (vii) power supply means for powering the portable handheld terminal; and
   (b) base station means including RF transceiver means for communication with the portable handheld terminal while the portable handheld terminal is in use.

16. A system in accordance with claim 15, wherein the base station means includes:
   (a) programmed microprocessor and memory means for controlling communication between the portable handheld terminal and a central computer system electrically wired to the base station means;
   (b) power supply means for powering the base station means;
   (c) charger assembly means for charging the power supply means of the portable handheld terminal; and
   (d) data over voice (DOV) means for communication with the central computer by telephone wires using data over voice techniques.

17. A portable handheld terminal system in accordance with claim 15, wherein the housing includes elongated handle means interconnected to the housing and extending longitudinally along the second major surface of the housing for holding of the housing by a user, the elongated handle means being displaced from the second major surface along a portion of its length, whereby the elongated handle means can be grasped by a user's fingers extending through an opening defined between the elongated handle means and the second major surface of the housing.

18. A portable handheld terminal system in accordance with claim 15, wherein the base station means and the portable handheld terminal include cooperating communication port means for electrical interconnection and transfer of data between the base station means and the portable handheld terminal.

* * * * *

Notice of Adverse Decisions in Interference

In Interference No. 102,391, involving Patent No. 4,850,009, Ronald E. Zook, Peter P. Gombrich, PORTABLE HANDHELD TERMINAL INCLUDING OPTICAL BAR CODE READER AND ELECTROMAGNETIC TRANSCEIVER MEANS FOR INTERACTIVE WIRELESS COMMUNICATION WITH A BASE COMMUNICATIONS STATION, final judgement adverse to the patentees was rendered May 1, 1991, as to claims 1-18.

*(Official Gazette Oct. 22, 1991)*